UNITED STATES PATENT OFFICE.

MARGUERITE HORTENSE LANÇON, OF BIENNE, SWITZERLAND.

ALUMINIUM SOLDER AND PROCESS OF MAKING SAME.

SPECIFICATION forming part of Letters Patent No. 507,822, dated October 31, 1893.

Application filed February 15, 1892. Serial No. 421,661. (No specimens.) Patented in France December 7, 1891, No. 217,892; in Belgium December 9, 1891, No. 97,502; in Germany December 19, 1891, No. 66,398, and in Austria-Hungary September 29, 1892, No. 30,265 and No. 44,590.

*To all whom it may concern:*

Be it known that I, MARGUERITE HORTENSE LANÇON, of Bienne, Switzerland, have invented a new Aluminium Solder and Process of Making the Same, (for which I have obtained Letters Patent of France for fifteen years, dated December 7, 1891, No. 217,892; in Belgium, dated December 9, 1891, No. 97,502; in Germany, dated December 19, 1891, No. 66,398, and in Austria-Hungary, dated September 29, 1892, No. 30,265 and No. 44,590;) and I do hereby declare that the following is a full and exact description thereof.

My invention has for its object a new industrial product, whereby aluminium can be practically and readily soldered. It has also for its object the process of obtaining this soldering material.

The application of my new soldering material gives perfect results and which are similar to those obtained in the soldering of the other metals. It applies to the pure trade aluminium, as well as to the aluminium, which is composed of ninety-eight parts out of one hundred and less. This soldering supports both drawing and rolling and its use is as easy as is that of any other known solder. As aluminium melts at a temperature of 800° centigrade, the solder must be composed in different proportions, according to whether aluminium wire or aluminium plates or pieces are operated upon.

For the soldering of aluminium wire or other small objects, such as jewelry or watches, my new material is composed as follows: pure aluminium, ninety-five per cent.; pure copper, one per cent.; pure tin, four per cent. For certain articles, instead of tin, the following metals will be used: bismuth, two per cent.; zinc, one per cent.; tin, one per cent.

The solder is prepared in the following manner: The aluminium is, in the first place, melted in a pure porcelain crucible, which will withstand the greatest heat. This is done while careful not to get the temperature too high. The melted aluminium is covered with humid anhydrous, meta-phosphoric, or phosphoric acid, so that the melted aluminium will be wholly covered by the melted acid. Then are added successively the copper and the tin. The acid forms a scum at the surface. Stirring is employed to form the alloy and to separate the scum, a small polished steel rod being used for that purpose. The heated ingot is then poured out, while still continuing to stir, onto a fire-clay or very hard stoneware slab. Instead of phosphoric acid bi-sulphate of soda or other alkaline acid sulpate; or bi-alkaline fluorides (which, however, are not so advantageous), or, in general, bi-salts, which have very pronounced acid properties, and which are not easily volatile, may be used.

For large pieces of aluminium and for surfaces, the soldering is composed as follows: pure aluminium, ninety-five per cent.; pure copper, two per cent.; pure antimony, one per cent.; pure bismuth, one per cent.; pure zinc, one per cent. The process is the same as that above described. The phosphoric acid, or the salts named are put into the melted aluminium, and then are successively added the copper, the antimony, the bismuth, and the zinc. The same care as that mentioned above is taken in the melting and the formation of the ingot. For certain articles, instead of this solder, may be used the following alloy: pure aluminium, sixty per cent.; pure copper, thirteen per cent.; pure bismuth, ten per cent.; pure antimony, fifteen per cent.; pure tin, two per cent. The surface of the melted metal is also protected in the manner shown above.

By the above processes, perfectly pure surfaced ingots may be obtained, which are proper for the soldering of aluminium.

Having thus described my invention, what I claim as new, and desire to secure by Letters Patent, is—

1. The herein described soldering compound, consisting of aluminium ninety-five per cent., copper one per cent., and tin four per cent., as specified.

2. The process herein described of producing aluminium solder, consisting in melting aluminium subjecting it to the action of phosphoric acid or its stated equivalent, adding copper and tin, and stirring the mass, as specified.

In witness whereof I have hereunto set my hand in presence of two witnesses.

MARGUERITE HORTENSE LANÇON.

Witnesses:
CHS. BURRI-HALDI,
ALEXANDRE HUBAUT.